INVENTORS.
WALTER TYDON
RICHARD K. RUHE
BY
ATTORNEYS

March 10, 1959 W. TYDON ET AL 2,876,969
AIRCRAFT TRANSPORTABLE PALLET FLOOR
Filed Oct. 28, 1953 5 Sheets-Sheet 2

INVENTORS.
WALTER TYDON
RICHARD K. RUHE
BY
ATTORNEYS

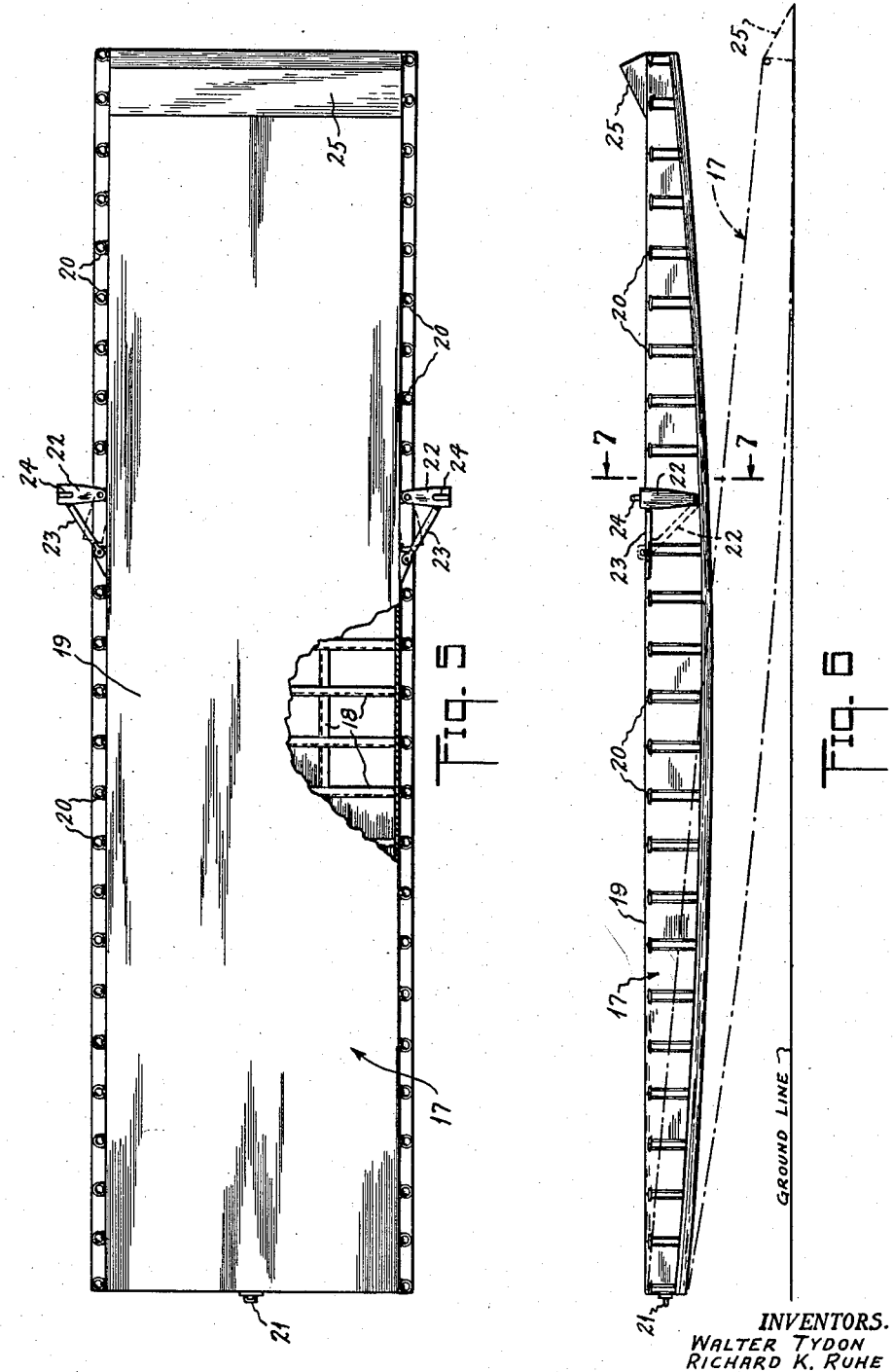

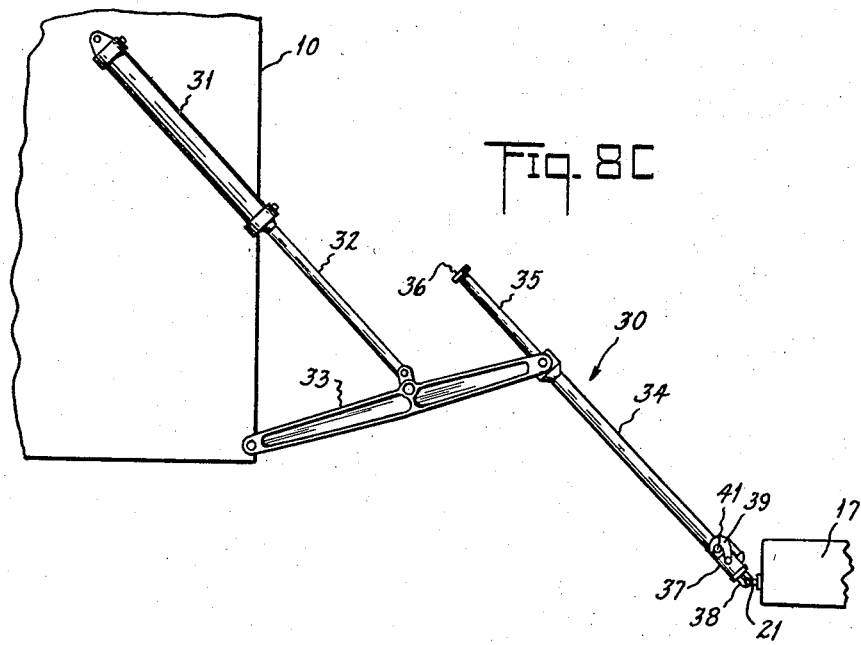
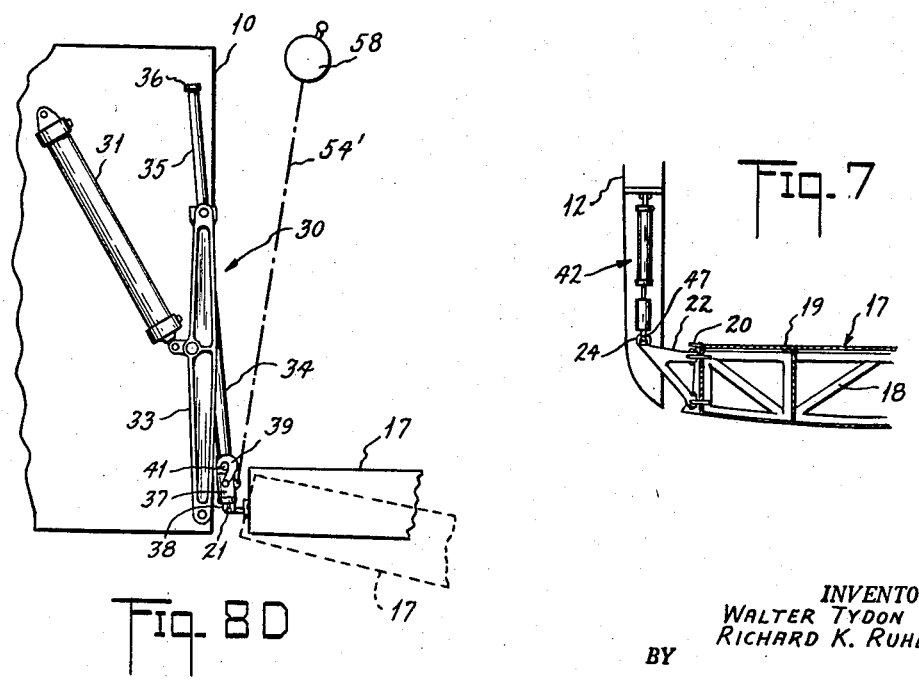

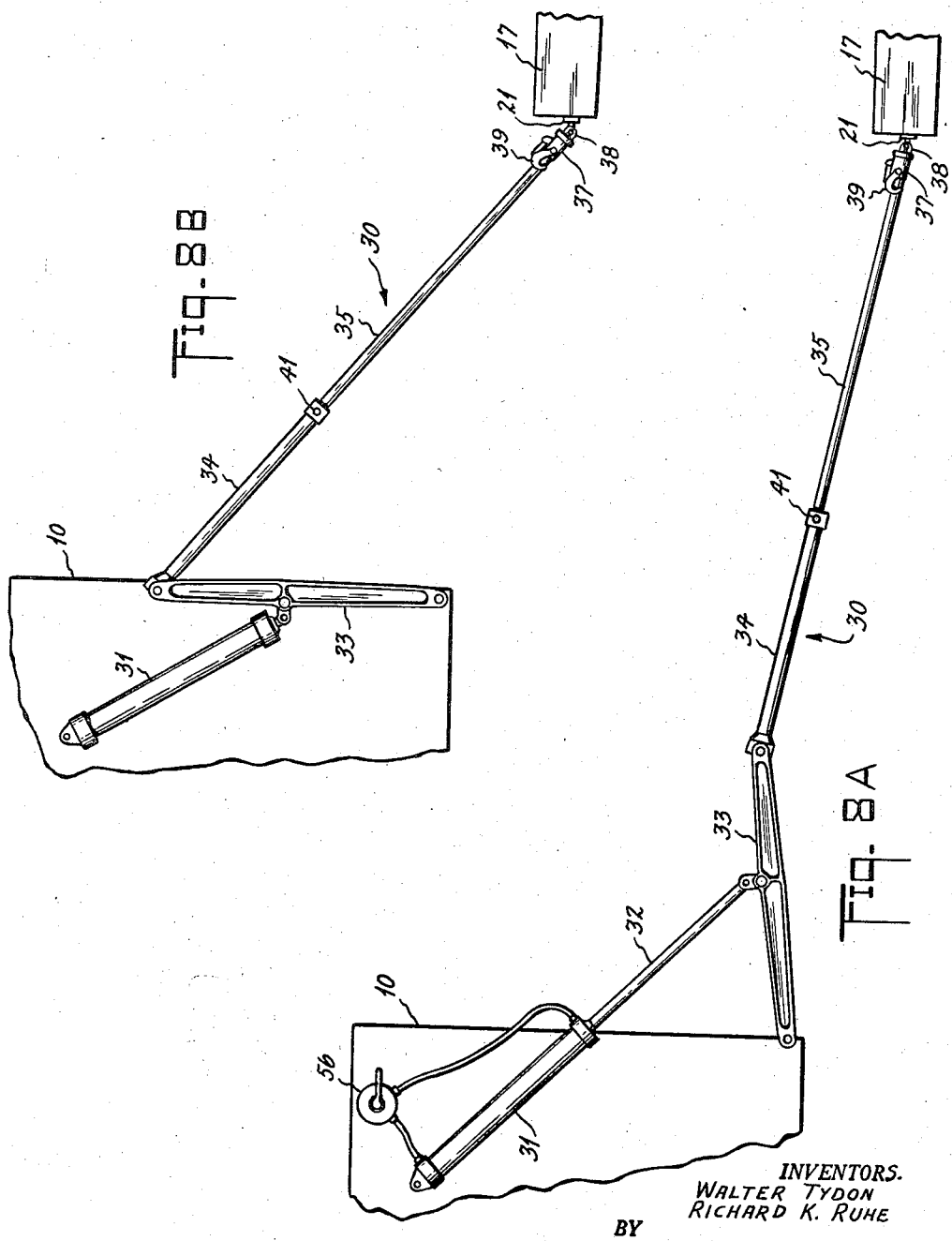

United States Patent Office 2,876,969
Patented Mar. 10, 1959

2,876,969

AIRCRAFT TRANSPORTABLE PALLET FLOOR

Walter Tydon, Hagerstown, Md., and Richard K. Ruhe, Charmain, Pa., assignors to Fairchild Engine and Airplane Corporation, Hagerstown, Md., a corporation of Maryland Application October 28, 1953, Serial No. 388,828

5 Claims. (Cl. 244—118)

This invention relates to pallet floors, and has particular reference to pre-loaded pallets which may be loaded into and become the flooring of cargo aircraft and other vehicles carrying heavy loads.

Because of the heavy traffic on airfields and airports, it is desirable to dispatch aircraft as soon after landing as is possible, leaving only sufficient time for refueling, unloading and reloading. If any of these necessary operations could be shortened, the traffic conditions at heavily used airfields and airports would be materially improved. This is particularly true in loading and unloading cargo aircraft, since the stowing of cargo must be carefully done to maintain the trim of the craft, and that requires a substantial time in properly stowing the articles constituting the cargo, particularly if they are of different weights and of sizes having no direct relation to the weight, as is usually the case.

In accordance with the present invention, a pallet floor for aircraft or other vehicles is provided which is separable from the aircraft and may be loaded and unloaded at a remote point from the aircraft destined to carry it, or from which it was removed, and it is so arranged as to be rapidly emplaced as the floor of the craft with its load remaining intact thereon, and as rapidly removed from the aircraft and from the runways or other active parts of the landing field or airport for unloading.

In a preferred embodiment of the invention, the floor of the aircraft comprises a pallet, preferably of the size of the aircraft cargo hold, arranged to fit within the fuselage or cargo hold as its floor and occupy substantially the entire horizontal area thereof. The forward end of the pallet floor is detachably connected to the forward end of the cargo hold with the aft end of the pallet floor resting on the ground to serve as a loading and unloading ramp, if desired. Preferably, the pallet floor is preloaded and emplaced in the cargo hold as its floor and detached therefrom and removed as a unit at its destination where it may be placed by another preloaded pallet floor for the return aircraft trip. To that end, the pallet floor may be fitted with wheels, preferably detachable, so as to render the pallet floor roadable for transportation of preloaded cargo to and from the cargo aircraft. The wheels, whether or not detachable from the pallet floor, are arranged for steering and the resulting vehicle may be drawn long distances by a truck, tractor or powered dolly, as the case may be, to its destination for unloading and reloading for return and reattachment as the floor of the next available cargo aircraft.

It will be seen that the pallet floor of this invention enables more rapid loading and unloading of aircraft in a simple and efficient manner without unnecessarily delaying the aircraft at the airfield or airport for that purpose, and although particularly adaptable for aircraft, the pallet floor may be used with equal facility for loading and unloading trucks, barges, and other cargo-carrying vehicles or vessels.

For a more complete understanding of the invention, reference may be had to the accompanying drawings, in which:

Fig. 5 is a plan view of the pallet floor;

Fig. 6 is a side view thereof and the dotted lines show its inclination when used as a loading and unloading ramp;

Fig. 7 is a transverse section through an edge of the pallet floor as seen along the line 7—7 of Fig. 6;

Figure 4:
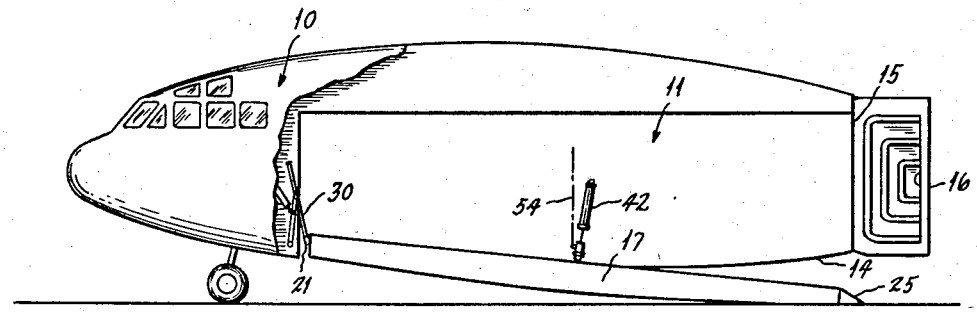
Fig. 4 is another elevation of the fuselage with the side wall broken away to show the pallet floor in place therein and serving as a ramp in one use thereof for loading and unloading at the site of the airplane.
Figure 9:
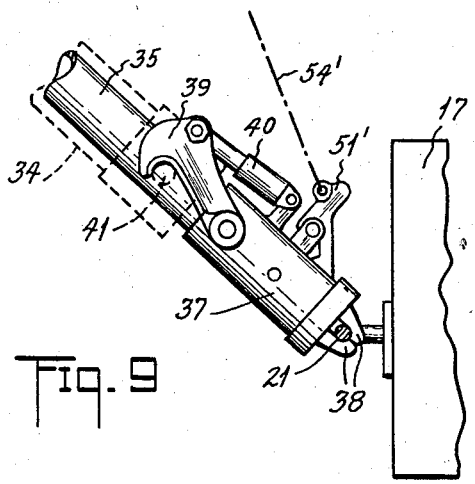
Figure 10:
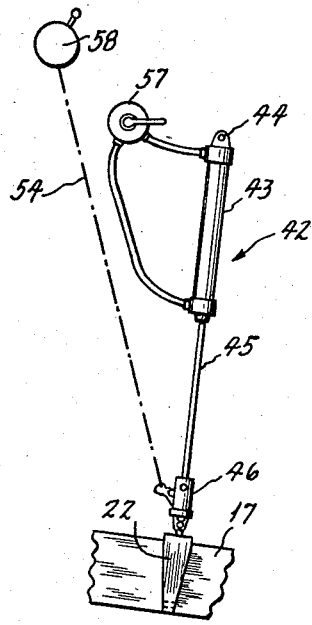
Figure 11:
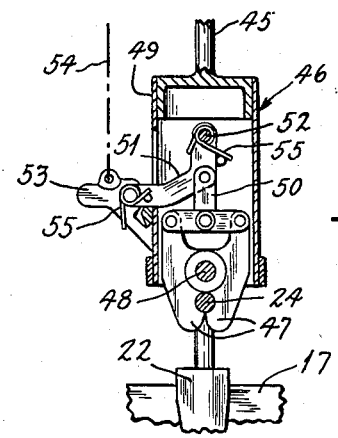

Figs. 8A, 8B, 8C and 8D jointly illustrate the successive stages of operation of the mechanism for drawing the pallet floor into the airplane cargo space and for connecting the forward end thereof to the airplane;

Fig. 9 is an enlarged view of the disconnect and hook portion of the mechanism shown in Figs. 8A–8D;

Fig. 10 is illustrative of the pallet floor side hoist mechanism shown in the extended position when the floor is used as a ramp as shown in Fig. 4; and Fig. 11 is an enlarged view of the disconnect portion of the mechanism shown in Figs. 8A–8D and 10.

Referring to the drawings, numeral 10 designates the fuselage of a cargo airplane having the cargo space or hold 11 formed of side walls 12 and roof 13, but having an open bottom 14 and an open rear end 15, the latter being normally closed by clamshell type doors 16 hinged to the side walls 12 and shown in open position in Figs. 1 to 4, inclusive. The wings, motors and other appurtenant airplane parts are partially shown, but since they form no part of the present invention, they need not be further referred to.

Adapted to fit within the open bottom 14 of the cargo hold 11 to serve as the removable and replaceable floor thereof is the pallet floor 17. To that end, the pallet floor 17 has the length slightly less than the cargo space or hold 11 and is somewhat narrower, so as to fit therein as shown especially in Figs. 1 and 2.

The preferred structure of the pallet floor is shown in Figs. 5, 6 and 7, and comprises a plurality of longitudinal and transverse trusses of aluminum alloy welded together into a strong, lightweight structure frame 18 overlaid with an aluminum plate forming the top surface 19 of the pallet floor 17. Spaced along the opposite upper longitudinal edges are tie-down rings 20 for ropes, hooks or other rigging for lashing the cargo to the pallet floor.

Secured to the center of the front edge of the frame 18 of pallet floor 17 is a U-shaped front hoisting and towing fitting 21. Vertically pivoted at opposite sides about two-thirds of the way back are side hoisting fittings 22, which are locked in the extended position shown by links 23 which may be removed so that fittings 22 may be swung flatwise against the corresponding sides of the pallet floor 17 as shown in dotted lines in Figs. 5 and 6. Cross bar 24 at the extremity of side hoisting fittings is adapted to be engaged by the grapple jaws of the automatic release hoisting mechanism to be described.

Pivoted along the rear edge of the pallet floor so as to be folded down from the solid line position to the dotted line position shown in Fig. 6, is a triangular section block 25 for extending the upper surface of the pallet floor to the ground surface when used as a ramp. Block 25 may be disconnected and stowed separately from the pallet floor 17 when the latter is not used as a ramp.

Figure 2:
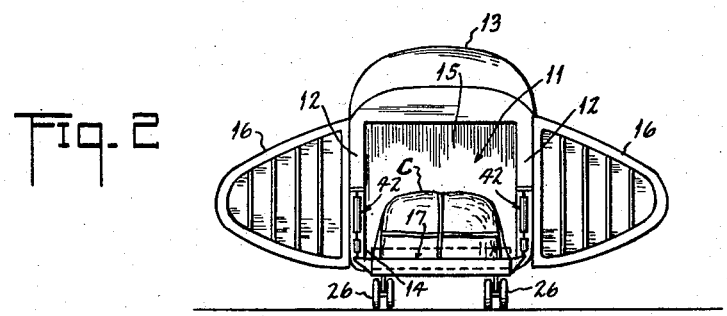
Fig. 2 is a rear view of the fuselage showing the pallet floor mounted on removable wheels rendering it roadable.
Figure 3:
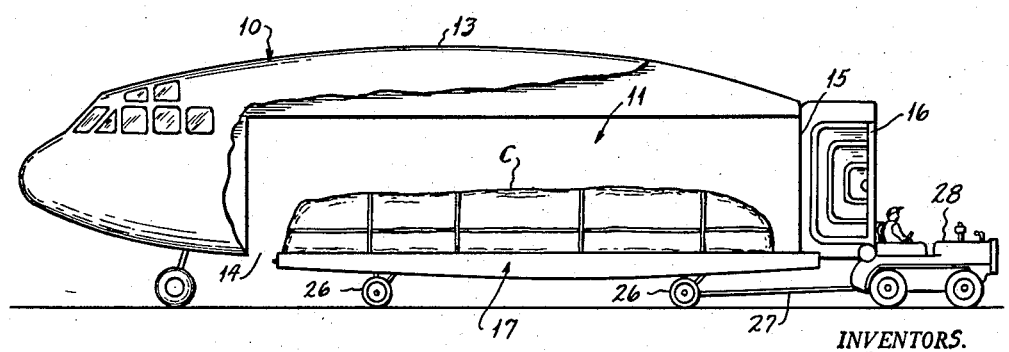
Fig. 3 is an elevation of the fuselage with the side wall broken away to show the pallet floor mounted on removable wheels and being moved with its cargo away from the airplane.

As shown in Figs. 2 and 3, the pallet floor 17 is fitted with removable wheels 26 rendering it roadable for transporting preloaded pallet floors 17 to and from airports or other landing fields for emplacement in the cargo space 11 as the floor thereof and removal from the cargo space for transportation to its destination where it is unloaded and reloaded for return to the airplane. Preferably, the wheels 26 together with their springs or shock absorbers are removable and replaceable as units in a known manner, such as is disclosed in copending application Serial No. 364,026, filed June 25, 1953, by applicant Tydon, for example. The wheels are removed before the airplane is airborne so as to reduce air drag and may be stowed in the airplane or stored at the airports for interchangeable replacement on arriving pallet floor aircraft before the pallet floor is released from the latter.

As disclosed in said copending application, the front wheels are steerable and fitted with a removable drawbar 27 for hitching to a tractor 28 as shown in Fig. 3, to a truck, powered dolly, or other draft apparatus.

As shown particularly in Figs. 2 and 3, the pallet floor 17 rests on its wheels 26 at a lower level than the lower edges of the fuselage walls 12, so that it must be raised to be emplaced as the floor of the cargo space 11. The preferred mechanism for drawing the pallet floor forwardly and upwardly is shown in greater detail in copending application Serial No. 266,925, filed January 17, 1952, by William B. Westcott, Jr., now Patent 2,697,569 which issued December 21, 1954. To the extent that the mechanism shown in said Westcott application is utilized and adopted herein, that is illustrated especially in Figs. 8A to 8D, 9, 10 and 11.

Figure 1:
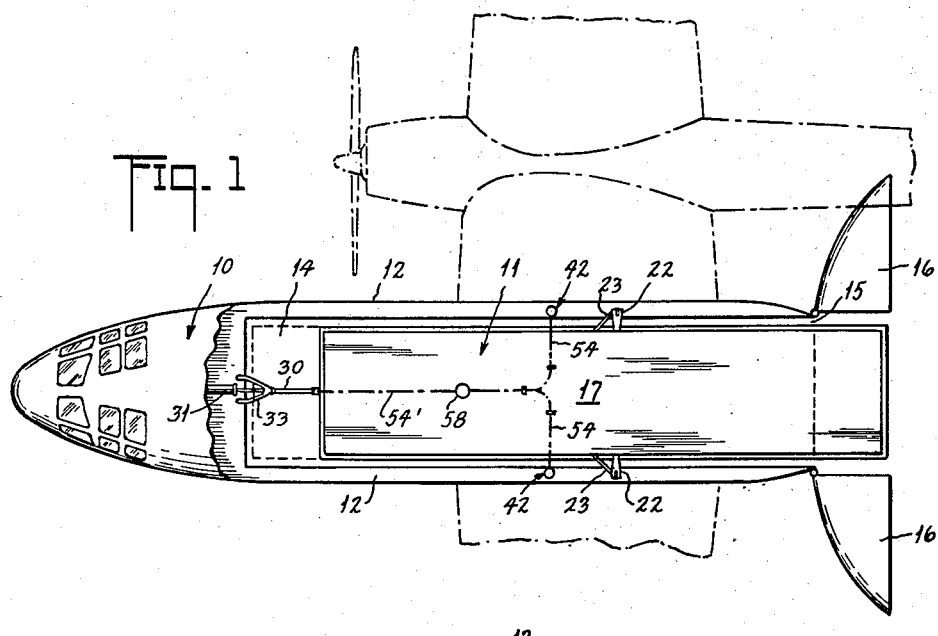
Figure 1 is a plan view of the fuselage of a cargo airplane with the roof of the fuselage removed to expose the interior cargo hold thereof showing that it has no fixed floor, but that a removable pallet floor forms the floor and is shown being moved into place therein.

Referring to Fig. 8A, the drawing mechanism includes drawbar 30 which is pivoted at its front end to the fuselage 10 at the forward end of the cargo space 11 and located on the longitudinal center line thereof, as shown in Fig. 1. A fluid-actuated cylinder 31 is pivoted at one end within the fuselage 10 and its piston actuated by a fluid pressure control valve 56 of conventional construction and preferably located within fuselage 10. The piston rod 32 thereof is pivotally connected to an A-frame 33 which forms the forward end of the articulated drawbar 30.

The rear end of the A-frame 33 is pivoted on the forward end of a tubular sleeve 34 which is slidably telescoped over a tubular rod 35 having an enlargement 36 at its forward end adapted to engage a stop within the rearward end of the sleeve 34 to prevent rod 35 from being drawn out of the sleeve when extended forwardly to the full extent shown in Figs. 8A and 8B. The rearward end of the rod 35 is provided with a quick release fitting 37 having projecting grapple jaws 38 for embracing and thus gripping the front hoist and tow fitting 21 of the pallet floor 17, as indicated in Fig. 9, and to be described in greater detail.

Pivoted on the fitting 37 is a hook 39 biased by spring unit 40 in a counter-clockwise direction as seen in Fig. 9 to a position such that the bight of the hook 39 has the approximate center line of the rod 35 so as to be aligned and cooperate with a pin 41 on the forward end of sleeve 34 in a manner to be described. A second hook 39 on the opposite side of rod 35 cooperating with a second pin 41 on the opposite side of sleeve 34 may be employed and, since they will lie immediately behind hook 39 and pin 41, respectively, they will not be visible in Fig. 9.

Mounted about two-thirds of the way aft of the cargo space 17 and within the opposite walls 12 is the side hoist mechanism 42 adapted to latch on to the side hoisting fittings 22 on the pallet floor 17 when the latter is moved into the space 11 to align fittings 22 and hoist mechanism 42. This side hoisting mechanism 42 is illustrated in Figs. 10 and 11 and comprises an hydraulic cylinder 43 pivoted at its upper end on pin 44 secured to the corresponding side wall 12 of cargo space 11 and having the piston rod 45 extending from its lower end and carrying the quick release fitting 46 whose grapple jaws 47 embrace and thus grip the cross bar 24 of the side hoisting fitting 22 mounted on the pallet floor 17. Quick release fitting 46 is like quick release fitting 37 of Fig. 9, and both are essentially constructed like a conventional glider tow release. As such the grapple jaws 47 shown in Fig. 11 are pivoted on a pin 48 extending across tubular casing 49 secured to the lower end of piston rod 45, and a toggle linkage 50 normally spreads the upper ends of the jaws 47 apart so that their lower ends are held closed about the bar 24. Toggle 50 is connected to the elbow of bell crank lever 51 pivoted at its inner end on pin 52 in the casing 46 with its other end projecting through a slot therein and in turn pivoted on an external trigger 53 to which a release cable 54 is connected for breaking the toggle 50 to open jaws 47 for releasing the bar 24. Springs 55 normally hold the toggle 50 in the closed position shown in Fig. 11. The quick release mechanism 37 of Fig. 9 is constructed in the same way, and the description of one will suffice for the other. It will be understood that the trigger 51' and the cable 54' of Fig. 9 perform the same functions as the trigger 51 and the cable 54 of Figs. 10 and 11.

In operation of the cargo aircraft pallet floor arrangement of this invention, and assuming that the pallet floor 17 equipped with its wheels 26 has been preloaded at a remote point with its cargo C lashed thereto, it is drawn as by tractor 28 to the airfield where the cargo aircraft awaits reloading. As shown in Fig. 3, the wheeled pallet floor 17 is backed into the cargo space 11 by the tractor 28 up to a point where the drawbar 30 can be connected to front fitting 21 by the closing jaws 38 of release mechanism 37 around fitting 21 which is done manually by pushing trigger 51 downwardly to close toggle 50 with the aid of springs 55, shown in Fig. 11. The tractor 28 is then disconnected and the operator manipulates control valve 56 to cause pressure fluid to flow into hydraulic cylinder 31 to the lower side of the piston therein, whereby piston rod 32 raises A-frame 33 from the position shown in Fig. 8A to that shown in Fig. 8B and draws the pallet floor forwardly to the position shown in Fig. 8B.

The operator again manipulates control valve 56 to force the piston rod 32 downwardly to the position shown in Fig. 8C, thereby causing tube 34 to slide downwardly along rod 35 until hook 39 is cammed upwardly by pin 41 to allow the latter to pass, whereupon hook 39 is returned by its spring member 40 to snap over and thus hold pin 41 in the manner shown in dotted lines in Fig. 9, with the drawbar 30 in the articulated position shown in Figs. 1 and 8C.

The final position of the drawbar 30 is shown in Fig. 8D and is effected by a fourth manipulation of control valve 56 to draw piston rod and A-frame upwardly, whereby pallet frame 17 is brought to its forward position wholly within the cargo space 11 and, by reason of the coupling of hook 39 and pin 41 on the tube 34, the front end of pallet floor 17 is raised from the level shown in Fig. 8C to that shown in Fig. 8D where the said front end lies flush with the bottom of fuselage 10. Since the road level of pallet floor 17 shown in Figs. 2, 3 and 8C is lower than the position shown in Fig. 8D, the front wheels 26 are lifted from the ground and may be conveniently removed if desired.

Upon the above-described movement of the pallet floor 17 to its extreme forward position shown in Fig. 8D, side hoisting brackets 22 on the pallet floor 17 are brought into registry with side hoisting mechanisms 42 in the side walls 12 of the cargo space 11. The brackets 22 are all swung out to the angle shown in Figs. 5 and 7 and locked in place by means of link 23. The hydraulic pressure control valve 57 is manipulated to extend piston rod 45 downwardly so that jaws 47 of the disconnect fittings 46 can be closed on corresponding bars 24 on the pallet floor side hoisting brackets 22 by manually moving the corresponding triggers 53 downwardly in the manner described so that the side hoisting mechanisms 42 are coupled to the pallet floor 17 as shown in Fig. 10.

Remanipulation of centrol valve 57 raises piston rods 45 of the two side hoisting mechanisms 42, so as to raise pallet floor 17 to the level position shown in solid lines in Fig. 8D and also in Figs. 2 and 7. By removing the wheels 26 or the rear wheels and drawbar 27 if the front wheels had been removed when the front end of the pallet floor 17 was hoisted by drawbar 30, the preloaded pallet floor 17 is secured in place in the cargo hold 11 as the floor thereof, and it remains only to close rear doors 16 to ready the airplane for cargo conveying flight.

Reversal of the above-described procedure is substantially effected to release a loaded pallet floor from the cargo airplane for roadable conveyance to the destination of the cargo. Upon landing of the airplane, wheels 26 and drawbar 27 are emplaced and triggers 51 and 51' released from a central control point indicated at 58 in Fig. 1 for simultaneous actuation of their respective release cables 54 and 54', thereby opening jaws 38 and 47 of disconnect devices 37 and 46 to release the pallet floor and allow it to drop the short distance to the ground, or on a platform ramp provided for that purpose, but not shown. Thereupon the loaded pallet floor 17 is drawn away by a tractor 28 or the like, in the manner shown in Fig. 3 for replacement by another loaded pallet floor standing by for the return flight of the cargo airplane.

Although the pallet floor 17 is especially adapted for preloading and unloading at a point remote from the airplane site, it may be unloaded and reloaded at that site or loaded with self-propelled vehicles at that site, depending upon requirements. To that end, the pallet floor 17 may serve as a ramp in the manner shown in Fig. 4, where the side hoisting mechanisms 42, after drawbar 30 has raised the front end of the pallet floor, are actuated by means of control valve 57 to lower the rear of the pallet floor 17 to the ground. With block 25 in position, cargo may be moved up the pallet floor 17 as a ramp and lashed to tie-down rings 20. When the pallet floor 17 has been loaded, valve 57 is remanipulated to cause retraction of piston rod 45 from the position shown in Fig. 10 to raise the pallet floor 17 from the inclined position shown in Figs. 4, 6 and 8D to the level positions shown in Figs. 2, 6, 7 and 8D, and the cargo airplane is ready for flight. Ramp unloading is effected in the reverse manner.

The entire cargo and its pallet floor may be jettisoned in flight if desired, by energization of common release mechanism 58, which may be a switch-actuated solenoid or a valve-actuated hydraulic cylinder for simultaneously pulling cables 54 and 54' to simultaneously release devices 37 and 46. In the same way, parachute-borne pallet floors 17 may be landed in flight, the parachute being mounted on top of the cargo with the usual static line thereof connected to the roof 13 of the cargo space 11 for releasing the up cord of the parachute after a predetermined free fall distance of the pallet floor 17 and its cargo. Inexpensive, expendable jettison pallet floors 17 may be employed for cargoes not subject to damage. Also for jettison and other purposes, the pallet floor 17 may be subdivided transversely into two or more separate sections each subject to separate release from the airplane, depending upon requirements.

Although a preferred embodiment of the invention has been illustrated and described herein, it is to be understood that the invention is not limited thereby, but is susceptible of changes in form and detail within the scope of the appended claims.

We claim:

1. In combination with an aircraft having a cargo space with an open bottom, a detachable pallet floor therefor, combination traction and hoisting mechanism interposed between the aircraft at the forward end of said cargo space and the forward end of said pallet floor, additional hoisting mechanism interposed between said aircraft at a rearward portion of said cargo space and a corresponding rearward portion of said pallet floor, and motive means for actuating said mechanisms to hoist and draw said pallet floor forwardly into registering position within said cargo space.

2. In combination with an aircraft having a cargo space with an open bottom, a detachable pallet floor therefor, contractible hoisting means interposed between the aircraft at the forward end of said cargo space and the forward end of said pallet floor, motive means for contracting said hoisting means to draw said pallet floor into registering position within said cargo space, additional hoisting mechanism interposed between said aircraft at a rearward portion of said cargo space and a corresponding rearward portion of said pallet flooring, motive means for actuating said mechanism to hoist said pallet floor into registering position within said cargo space, and quick releasable locking means interposed between said connecting and hoisting means and said pallet floor for securing the latter in said position.

3. In combination with an aircraft having a cargo space with an open bottom, a detachable pallet floor therefor, hoisting mechanism interposed between the aircraft at the forward end of said cargo space and the forward end of said pallet floor, motive means for actuating said mechanism to hoist said pallet floor into registering position within said cargo space, additional hoisting mechanism interposed between said aircraft at a rearward portion of said cargo space and a corresponding rearward portion of said pallet floor, motive means for actuating said mechanism to hoist said pallet floor into registering position within said cargo space and releasably locking means interposed between said hoisting mechanisms and said pallet floor for securing the latter in said position.

4. In combination with an aircraft having a cargo space with an open bottom, a detachable pallet floor therefor, combination traction and hoisting mechanism interposed between the aircraft at the forward end of said cargo space and the forward end of said pallet floor, motive means for actuating said mechainsm to hoist and draw said pallet floor forwardly into registering position within said cargo space, additional hoisting mechanism interposed between said aircraft at a rearward portion of said cargo space and a corresponding rearward portion of said pallet floor, motive means for actuating said mechanism to hoist said pallet floor into registering position within said cargo space and quick release locking means interposed between said hoisting mechanisms and said pallet floor for securing the latter in said position.

5. The aircraft set forth in claim 4, comprising means connected with said locking means interposed between said hoisting mechanisms and said pallet floor for simultaneously releasing said locking means to release said pallet floor from said aircraft.

References Cited in the file of this patent

UNITED STATES PATENTS

| | | |
|---|---|---|
| 2,315,117 | Freytag | Mar. 30, 1943 |
| 2,323,279 | Van Zelm | June 29, 1943 |
| 2,405,878 | Elwert | Aug. 13, 1946 |
| 2,448,862 | Conklin | Sept. 7, 1948 |
| 2,498,906 | Apperson | Feb. 28, 1950 |
| 2,616,639 | Burnelli | Nov. 4, 1952 |
| 2,634,656 | Woollens et al. | Apr. 14, 1953 |
| 2,697,569 | Westcott | Dec. 21, 1954 |

FOREIGN PATENTS

| | | |
|---|---|---|
| 636,536 | Great Britain | May 3, 1950 |
| 886,022 | France | June 15, 1943 |
| 1,049,557 | France | Aug. 19, 1953 |